United States Patent [19]

Holzer

[11] Patent Number: 4,509,328

[45] Date of Patent: Apr. 9, 1985

[54] THERMO-ELECTRIC RESPONSIVE DEVICE

[76] Inventor: Walter Holzer, Drosteweg 19, S-7758 Meersburg, Fed. Rep. of Germany

[21] Appl. No.: 339,498

[22] Filed: Jan. 15, 1982

[30] Foreign Application Priority Data

Jan. 19, 1981 [DE] Fed. Rep. of Germany ....... 3101473

[51] Int. Cl.³ ................................................ F03G 7/06
[52] U.S. Cl. .......................................... 60/528; 60/531
[58] Field of Search .............. 60/527, 530, 531, 513, 60/528; 236/99 K, 99 R

[56] References Cited

U.S. PATENT DOCUMENTS

| | | | |
|---|---|---|---|
| 3,664,698 | 5/1972 | Stropkay | 60/531 X |
| 4,016,722 | 4/1977 | Neiderer, Sr. | 60/531 |
| 4,079,589 | 3/1978 | Birli | 60/531 X |
| 4,104,507 | 8/1978 | Tisone et al. | 60/531 X |

*Primary Examiner*—Allen M. Ostrager
*Attorney, Agent, or Firm*—Hopgood, Calimafde, Kalil, Blaustein & Judlowe

[57] ABSTRACT

An electro-thermal actuating element. The element includes a container closed by a deformable element. The container holds a liquid and a positive thermal coefficient heating element. The heating element has a temperature/resistance curve having a sharp upward bend in a predetermined temperature range. The evaporation temperature of the liquid corresponds to the bend in the curve so that when the liquid is vaporized, the heating element is essentially switched off. The vaporization of the liquid deforms the membrane which is used for actuating external devices.

7 Claims, 7 Drawing Figures

THERMO-ELECTRIC RESPONSIVE DEVICE

If it is a matter, in the equipment and apparatus construction industry, of actuating individual component parts electrically, then use is made, in the case of conventional equipment, for example of a servomotor, a switching magnet, a solenoid or other arrangements which react to switching-on of a current with a mechanical motion, such as, for example, electrically-heated bimetals.

Common to these component parts is the fact that they are complicated, trouble-prone and, in addition to this, expensive. In the precision mechanics industry, but also in equipment construction, there are, however, numerous applications in which it is a matter neither of speed nor of accuracy, but operating reliability and price are to the forefront.

It has also already been proposed as a solution to heat expansion systems, for example with special wax fillings electrically in order to initiate mechanical procedures. In the case of these systems there arise, upon the expansion of the wax, very great forces which, without safety measures, lead to destruction of the system, above all when they are blocked from the outside. On account of the great expansion forces, these components are mostly constructed from stable metal capsules which are not completely closed and which are for insulation reasons poorly suitable for electrical heating.

For a simple and operationally-reliable electro-thermal actuating component there arises the posing of the problem of designing the electro-thermal function in such a way that, even upon the use of a plastics container, a bursting, even in the event of blocking from the outside, is impossible.

The invention fulfils this task in that, by a suitable combination of an electro-thermal and a thermo-dynamic characteristic of the component parts, the posed pre-requisites are achieved.

A further task not fulfilled by previous expansion actuating components consists in that the actuating motion takes its course reversibly exactly between two end positions, irrespective of how long the system remains switched on and to what ambient temperature the system cools down. This property, often crucial for practical usefulness, is also realised by the electro-thermal actuating component in accordance with the invention.

Added to this are, in comparison with other electromechanical systems, further advantages:

There are no sliding or rotating parts which can jam and if possible require maintenance; there are no sensitive wire windings, no sealing problems or the like.

The actuating component proposed in accordance with the invention consists of an electrical heating element, a medium which varies in a temperature-dependent manner, and a mechanical actuating part. What is characteristic is the fact that, as a result of the particular choice and the combination of specific properties, a self-stabilising actuating component with particular properties emerges. Provided as the heating element is a resistor having a positive temperature coefficient (PCT) which has, with suitable choice, the property of heating up only to a specific temperature, without overheating. This PTC resistor heats up, in a closed container, a liquid the evaporation temperature of which lies close under the bend in the characteristic of the PTC resistor. A deformable membrane arranged on the container reacts to the increase in volume through the resulting vapour and carries out a mechanical motion.

It is obvious that, with correct choice of the PTC resistor and of the liquid, optimum conditions for such an electro-thermal actuating component can be provided. On the one hand an overheating of the system can be prevented, by using, for example, a PTC resistor having a limiting temperature of 120° C. Such a resistor can never heat up electrically above this temperature. On the other hand, there can be provided in this temperature range as the liquid for example water which, as is well known, evaporates at about 100°. The motion of the membrane would consequently suddenly start with the reaching of the boiling point, in which respect, on the other hand, a pressure overloading of the system is precluded, since the vapour pressure even at the limiting temperature amounts to only about 2 bar. Thus the system is self-regulating and precisely defined. Special expenditure for control circuits is dispensed with.

Since the amounts of liquid can be kept very small—water vapour occupies, even at 2 bar evaporation pressure, ninehundred times the water volume—also the heating up of the system is comparatively rapid. As compared with electrically-heated bimetal systems, added to this is the fact that it is, in the case of the actuating component in accordance with the invention, a matter not of a continuous creeping motion, but the motion begins only with the reaching of the evaporation temperature and, as a result of the comparatively small amounts which have to be heated up, proceeds relatively rapidly.

Also the motion in the reverse direction when the current is switched off proceeds more favourably than in the case of bimetal systems which, upon cooling down to the ambient temperature, approach only slowly and asymptotically the end position.

The return motion, on the other hand, in the case of the electro-thermal actuating component in accordance with the invention proceeds at the evaporation temperature, which lies considerably above the room temperature and therefore a more rapid heat dissipation occurs as a result of the greater temperature difference.

What is essential is an intimate thermal coupling between the heating resistor and the liquid. For this reason it is proposed, in accordance with the invention, to use, instead of water, which is as is well known conductive, as the medium an electrically-insulating silicon oil or a similar liquid, which allows the PTC resistor with its connections to be surrounded directly with the liquid without a protective sheathing. Thus, a maximum of heat exchange is achievable and a direct connecting-up of the heating resistor is possible also in the case of 220 V mains voltage. Such an arrangement requires extremely small amounts of heat, so that, if need be, even an electronic control is possible, which for example precludes the use of bimetal systems in the case of such applications.

A further improvement consists in enclosing the heating element and the liquid in a plastics container the walling of which is designed partially as a deformable membrane, by designing the wall thickness, at the desired location, comparatively thin compared with the rest of the walling.

Such a system works particularly advantageously when the plastics container is filled completely with liquid if possible under vacuum. Thus, a return of the membrane into the initial position under the external atmospheric pressure is achieved as soon as the condensation of the evaporated medium takes its course. Any restoring springs or other component parts can thus be dispensed with.

Since the design of the membrane can be varied within wide limits, it is proposed, in accordance with the invention, to make the membrane non-symmetrical in design, so that, in addition to the linear displacement, also a swivel motion can be derived, in that on the movable part of the membrane, for example, a locking lever or other actuating part is arranged. As a result of this additional possibility there arise frequently constructional simplifications in the kinematic interplay of equipment functions, which can otherwise be realised only with complicated movement mechanisms.

The simple construction of the actuating component allows even a further constructional improvement, by arranging, for example, the membrane at one end surface of the plastics container and the electrical connections at the opposite end surface. With such an arrangement there is obtained a component part which is simple to handle and to produce and which, in addition, can be provided with fastening members similar to a bayonet catch, so that it can be inserted or exchanged in one movement of the hand. Also the arrangement of cooling ribs or a heat insulation is possible, depending on whether shorter or longer restoring times are desired. FIG. 6 shows, by way of example, the arrangement of cooling ribs 13.

BRIEF DESCRIPTION OF THE DRAWING FIGURES

Figure 1:
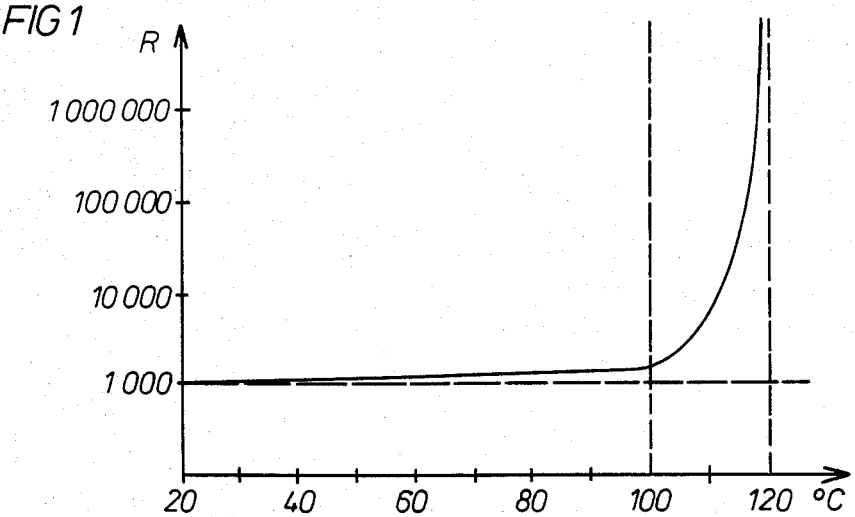
FIG. 1 shows a characteristic resistance verses temperature curve of a PTC resistor.

FIG. 1 shows the characteristic diagram of a PTC resistor, that is to say its resistance values R over the temperature, in degrees Celsius (°C.). (Similar to "Cold Conductor Type 063100-C 884", Messrs. Siemens). It can clearly be gathered from the characteristic that the resistance, for example 1000Ω in the range from 20° to 80° virtually does not vary, at 100° it gently rises and at 120° it already grows to some hundred thousand Ohms, so that it is tantamount to a switch-off of the heating current. In practical operation a resistance value will therefore settle down which is precisely sufficient to cover the heat losses.

Figure 2:
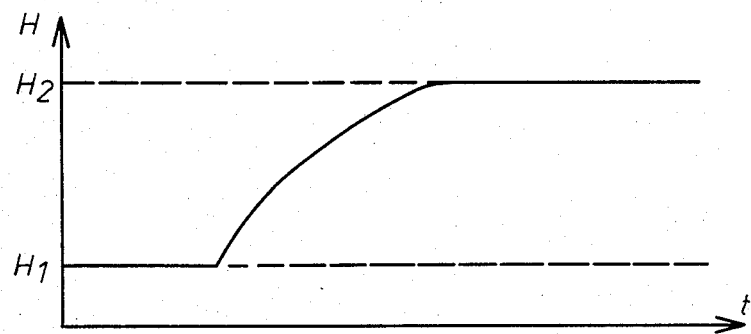
FIG. 2 shows a typical motion diagram of the electro-thermal component of the invention.

FIG. 2 shows the typical motion diagram of an electro-thermal actuating component in accordance with the invention. In the diagram the stroke H is recorded above the time t.

When the current is switched on, initially the heating resistor and the liquid surrounding it is heated up. Since the linear expansion of the liquid is very small, initially no perceptible movement of the membrane will take place.

The stroke of the membrane begins practically only with the reaching of the boiling point of the liquid and the evaporation. As soon as the stroke reaches the value H 2 (or, in the event of blocking of the system from the outside, already previously), the pressure in the system rises, until it reaches the vapour pressure which corresponds to the settled-down temperature.

The final stroke of the membrane in the position H 2 is clearly determined by the afforded bias of the membrane, since the final temperature of the PTC resistor on the one hand and on the other hand the vapour pressure of the medium used at this temperature are predetermined as physical factor.

Moreover, a PTC resistor of the said type heats up in fractions of seconds to its final temperature, so that this time can be disregarded.

Upon the cooling down, initially the vapour will condense, in which respect the evaporation temperature is maintained until the vapour is liquefied. This state corresponds to the position H1 of the membrane. A further cooling down of the system to room temperature has no practical effect, since it again takes place in the region of the linear expansion of the liquid.

Thus, in the case of such an electro-thermal actuating component in accordance with the invention, a clear co-ordination of the actuating forces is physically possible. on the one hand there exists an equilibrium between the supplied electrical energy and the afforded heat losses, which determines a clear temperature. On the other hand, corresponding to this temperature is clearly a vapour pressure of the medium which is again in equilibrium with the counteracting forces, that is to say the membrane bias and force components acting from the outside.

Since this vapour pressure for a predetermined system can never be exceeded, it is sufficient to rate the bursting pressure of the membrane or of the system respectively only for this pressure. In this way, even upon a blocking of the system from the outside, damage can never occur, since at any point in time, that is to say in the case of any position of the membrane, only the vapour pressure predetermined by the system temperature becomes effective.

Figure 3:
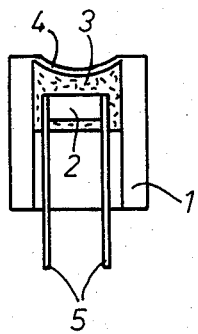
FIG. 3 shows one embodiment of the invention in the unheated state.
Figure 3A:
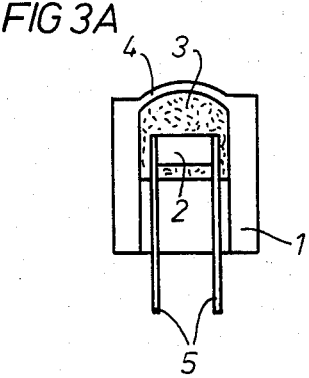
FIG. 3a shows the embodiment of FIG. 3 in the heated state.

FIG. 3 and FIG. 3a show one exemplified embodiment of an electro-thermal actuating component in accordance with the invention.

Enclosed in a housing 1, made for example of plastics material, is a PTC resistor 2 with connections 5, which is surrounded by a medium 3. The membrane 4 is shown in FIG. 3 in the unheated state and in FIG. 3a in the heated state. It can clearly be seen that, as a result of the increase in volume of the heated medium, the initially inwardly bent membrane is, in the heated state, forced outwards, so that a mechanical motion can be derived.

Figure 4:
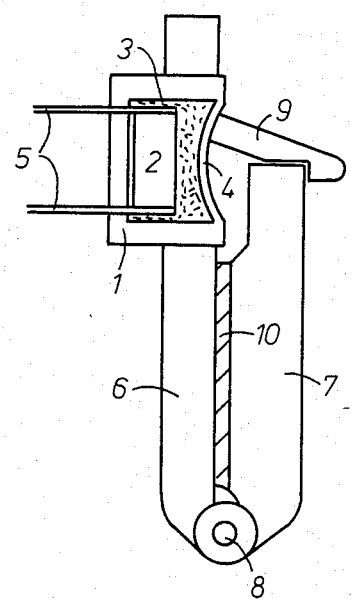
FIG. 4 shows an embodiment having a locking lever in the unheated state.
Figure 5:
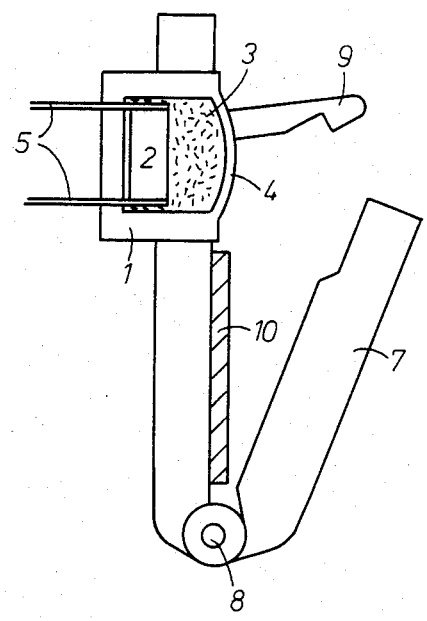
FIG. 5 shows the embodiment of FIG. 4 in the heated state.

FIG. 4 shows an exemplary design of an electro-thermal actuating component with a locking lever which is arranged on the membrane and which carries out, in addition to the displacement, also a swivel motion. In this exemplified embodiment, an electro-thermal actuating component, similar to FIG. 3, is attached in a plate 6. Arranged on the membrane 4 is a locking lever 9 which, more especially in the case of a design of the membrane 4 as an injection-moulded plastics part, is moulded directly as an integrated part of the membrane. The locking lever 9 holds a flap 7, which is mounted for rotation at point 8, against a sealing surface 10. The flap 7 serves, in this respect, upon abutment against the sealing surface 10, for the closure of a compartment in which there is a rinsing agent. If the resistor 2 is now heated, it leads to the known deformation of the membrane 4, and the locking lever 9 connected rigidly to it will accordingly come into the position shown in FIG. 5. In this respect the locking of the flap is released, which flap can now swing out in a freely movable manner.

Figure 6:
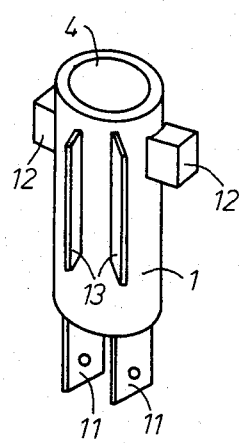
FIG. 6 shows a still further embodiment of the invention.

Shown in FIG. 6 is a particularly advantageous design of an electro-thermal actuating component, in which respect the same parts are again identified with the same numbers. The tubular design with the actuating membrane at one end and the flat plugs 11 at the opposite end surface is particularly simple to use in equipment. More especially as a result of the presence of bayonet catch parts 12, which makes possible the insertion and exchanging by one movement of the hand.

The possibilities of adapting an electro-thermal actuating component in accordance with the invention to constructional requirements are exceptionally manifold and can impossibly all be described as variations, but the basic function can clearly be seen from the examples, so that it is readily possible to construct actuating components in accordance with this invention which, for example, allow a double-sided tripping or a tripping movement around the corner, that is to say laterally.

Possible as field of application for such an actuating component are all those fields of application where the slight time delay can be accepted, where heed is to be paid to small spatial dimensions and where a gentle, not sudden, motion is desired.

Also the omission of any regulating expenditure is of crucial significance. Actuating components in accordance with the invention can preferably be used in washing and dishwashing machines where, by way of a contact of the programme switchgear, such an actuating component can be switched on and also a very long switch-on duration of the programme contact does not lead to destruction of the component.

I claim:

1. An electro-thermal actuating component comprising:
    a container;
    an electrical heating element disposed in said container and having a positive thermal coefficient with a temperature/resistance curve having a sharp upward bend in a predetermined temperature range;
    a deformable membrane disposed across said container to close same;
    a liquid disposed in said container and immersing said heating element, said liquid having an evaporation temperature in the range of the bend in the temperature/resistance curve of said electrical heating element to vaporize in the predetermined temperature range of the electrical heating element to deform said membrane from a concave to a convex flexure;
    a swiveling locking lever disposed proximate said membrane, upon deformation of said membrane from said concave to convex flexure said lever swiveling from a first to a second position.

2. An electro-thermal actuating component as claimed in claim 1, wherein said liquid comprises an electrically insulated silicon oil.

3. An electro-thermal actuating component as claimed in claim 1, wherein said container comprises a plastic container, one wall of which forms the deformable membrane.

4. An electro-thermal actuating component as claimed in claim 1, wherein said liquid is introduced under a vacuum into the container.

5. An electro-thermal actuating component as claimed in claim 1, wherein said container is constructed of polymeric material and includes an integral membrane disposed at one end surface and said electrical heating element is disposed at the opposite end surface.

6. An electro-thermal actuating component as claimed in claim 1, wherein said container includes means for fastening said container to another object.

7. An electro-thermal actuating component as claimed in claim 1, further including cooling ribs disposed on said container.

* * * * *